H. E. HUNSBERGER.
RESILIENT WHEEL.
APPLICATION FILED JULY 25, 1918.
1,330,943.
Patented Feb. 17, 1920.
2 SHEETS—SHEET 1.
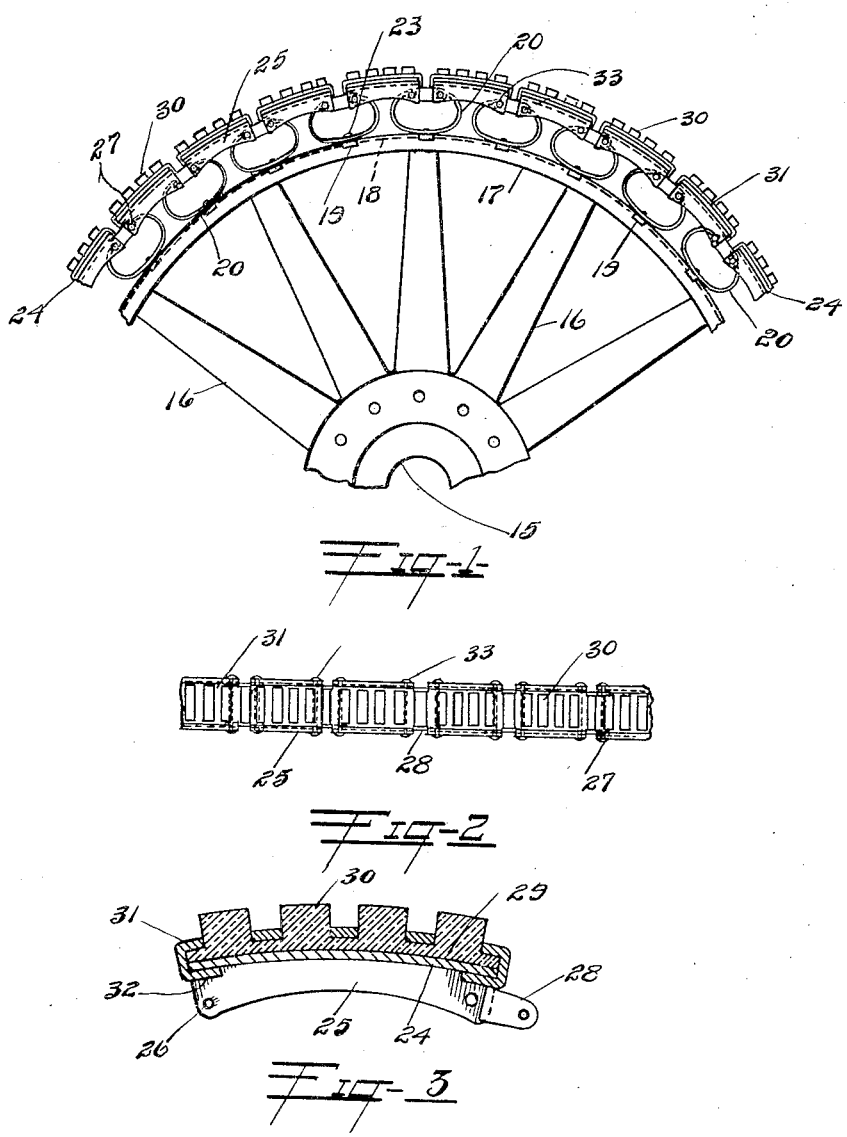
INVENTOR.
Herbert E. Hunsberger.
BY
Monroe & Learman
ATTORNEYS.

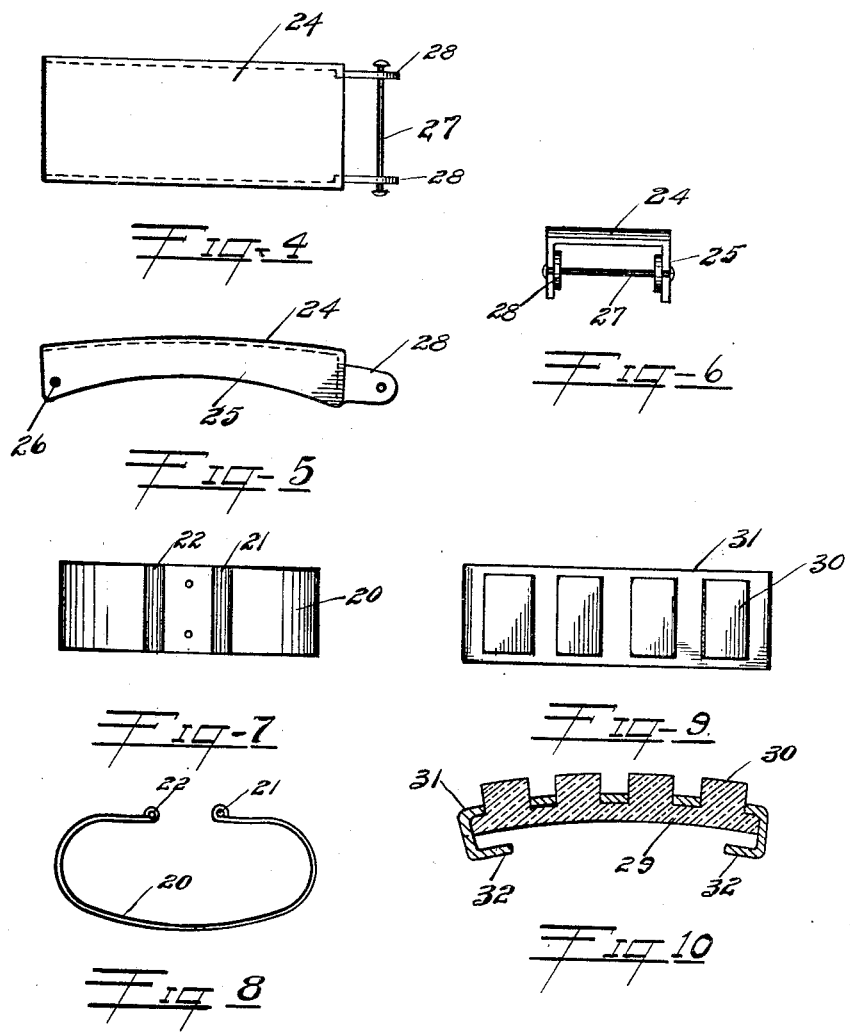

UNITED STATES PATENT OFFICE.

HERBERT E. HUNSBERGER, OF BAY CITY, MICHIGAN.

RESILIENT WHEEL.

1,330,943.  Specification of Letters Patent.  Patented Feb. 17, 1920.

Application filed July 25, 1918. Serial No. 246,689.

*To all whom it may concern:*

Be it known that I, HERBERT E. HUNSBERGER, a citizen of the United States of America, residing at Bay City, in the county of Bay and State of Michigan, have invented certain new and useful Improvements in Resilient Wheels, of which the following is a specification.

The present invention relates to the art of resilient wheels, and more particularly to that type having a deformable outer rim composed of linked rim segments.

The object of this invention is to provide a structure of this character which as compared with the prior art more nearly approaches, in functioning, the resilience of the ordinary pneumatic tired wheel, and with the elimination of all of the disadvantages incident to the use of the pneumatic tire.

The attainment of this object is accomplished by the provision of a peculiar connecting of, and a peculiar spring mounting for the linked segments; admitting the relative free movements thereof and supporting the same in such a manner as to obtain relatively great flexibility.

The invention also embodies a novel cushioning means which may be applied to the links individually for increasing resiliency of the wheel and for deadening the rumbling and other noises caused by the rolling of the wheel.

The above, and other more or less important objects and advantages of this invention will be in part pointed out in, and in part understood from, the following detailed description of the present preferred embodiment, the same being illustrated in the accompanying drawings, wherein:

Figure 1 is a fragmentary side elevation of a resilient wheel constructed according to this invention.

Fig. 2 is a peripheral edge view of the same.

Fig. 3 is a longitudinal vertical section through one of the tread links.

Fig. 4 is a plan view of one of the tread links.

Fig. 5 is a side elevation of the same.

Fig. 6 is an end view of the tread link.

Fig. 7 is a plan view of one of the supporting springs employed.

Fig. 8 is an edge view of the same.

Fig. 9 is a plan view of a resilient tread member which may be mounted on a respective link.

Fig. 10 is a longitudinal section through the same.

Referring to these drawings by numerals, the wheel body or inner rim supporting structure may be of any adaptable form, and is disclosed in the present instance as comprising a hub 15 having radiating spokes 16 upon which the inner rim or felly 17 is secured.

The rim 17 has, preferably, a peripheral groove or depression 18 and suitably spaced apart transverse ribs 19 which may be integrally formed with or secured to the rim 17.

The inner rim 17 carries a plurality of springs 20 with one spring mounted on each rib 19. Each spring 20 comprises a length of sheet spring metal bowed intermediate its ends and having its ends returned in spaced relation to form substantially a full elliptic spring. The spaced free ends of the spring 20 are rolled over to provide eyes 21 and 22, and the intermediate portion of the spring is adapted to be secured to the adjacent rib 19 by bolts 23, or the like.

The outer deformable rim is made up of a plurality of pivotally connected segments 24, each segment comprising a sheet metal body arcuate in form and provided at its lateral edges with reinforcing flanges 25 projecting inwardly or toward the axis of rotation of the wheel when the parts are assembled. The flanges 25 are preferably of greater depth at the ends of the segments to afford a better means of connection between the segments, and the flanges of each link or segment at one end thereof have transverse apertures 26 at the inner corners thereof to receive a transverse pivot bolt 27 which also passes through the eye 21 of the adjacent spring 20, the eye 21 being maintained between the flanges 25.

The other end of each link 24 is provided with a pair of longitudinally extending ears 28 which may form continuations of and are offset inwardly toward each other from the flanges 25. The ears 28 are apertured at their outer ends and are adapted to receive the bolt 27 of an adjacent link. The ears 28 are adapted to lie between the flanges 25 and the opposite ends of the eye 21.

The links or segments are thus connected in series entirely around the wheel, the pivots between the links being each supported upon one end of an adjacent spring 20. The end or eye 21 of each spring thus directly supports one end of one adjacent segment or link, and the other end or eye 22 of the spring is pivotally connected to the other end of the other adjacent link for directly supporting the same. The result is that the deformable outer rim is evenly supported throughout its periphery and presents no weak points capable of relatively easy flexing.

If desired, a cushion tread may be employed. As shown, the tread may comprise a resilient block 29 of rubber or the like adapted to seat upon the outer surface of each link and having relatively short transverse bars 30 on its outer face. The block 29 is held to the link by a frame 31 of sheet metal or the like having apertures therethrough to receive the bars 30 and provided with tongues 32 adapted to be bent around the ends of the links and turned thereunder for securely holding the frames and the blocks in place. Each link may be provided with this cushion structure for increasing resilience in the action of the wheel and for anti-skidding and noise deadening purposes.

The eyes 22 of the springs 20 are held in place by bolts 33 which are secured through the flanges 25 of the links. The bolts 27 and 33 may be pivots, pins or any suitable means for pivotally supporting the connected parts.

What is claimed is:

1. A spring wheel comprising an inner rim, springs on said inner rim, an outer rim comprising segments having projections at one end, the ends of each of said springs being attached respectively to the projections on one of said segments and to the end of the same segment from which the projections extend, the other end of said segment being attached to the adjacent end of the next spring.

2. A spring wheel comprising an inner rim, springs attached to said rim and having their free ends extending outwardly, segments attached at opposite ends to the proximate ends of adjacent springs, and means rigid with each segment and projecting from one end thereof, said means attached to the other end of the spring to which the adjacent end of said segment is attached.

3. In a resilient wheel, the combination of an inner rim, an outer deformable rim including segments with extensions on one end pivoted to the other ends of adjacent segments, and springs secured intermediate their ends to the inner rim and having free ends, one end of each spring being secured to the pivot between the adjacent segments and the other end of each spring being pivoted to the adjacent segment having the extensions.

4. In a resilient wheel, the combination of an inner rim, an outer deformable rim including a series of pivotally connected segments, and a plurality of springs carried by the inner rim and having ends projecting toward the outer rim, one end of each spring being secured to the adjacent pivot joint between the adjacent segments and the other end of the spring being secured to one of the adjacent segments.

5. In a resilient wheel, the combination of an inner rim, a plurality of springs secured to the inner rim and having spaced ends projecting toward the outer rim, and an outer deformable rim comprising a plurality of segments having inwardly extending flanges and inwardly offset ears on the flanges at one end of each segment adapted to fit between the flanges of an adjacent segment and pivoted thereto, one end of each spring being pivoted to the pivoted ends of the ears and the other end of the spring being pivoted to the adjacent segment having the said ears.

6. In a resilient wheel, the combination of an inner rim, springs carried by the rim and having spaced ends projecting from the rim, and a deformable outer rim comprising a series of connected segments each segment having ears on one end, a bolt connecting the ears of one segment to the other end of the adjacent segment and to one end of the adjacent spring, and a bolt connecting the other end of the adjacent spring to the segment having the said ears.

7. In a resilient wheel, the combination of an inner rim, an outer deformable rim comprising a series of links each having projections on one end adapted to engage the other end of an adjacent link, a pivot connecting the projections to said adjacent link, springs carried by the inner rim and having spaced ends extending outwardly therefrom, one end of each spring engaged by an adjacent pivot, and other pivots connecting the other ends of the springs to the ends of the segments having the projections.

8. In a resilient wheel, the combination of an inner rim, an outer rim having pivotally connected segments, springs interposed between the rims, cushion tread members seated on the segments and having transverse ribs on their outer surfaces, and frames fitting over the tread members and provided with transverse slots adapted to receive the ribs therethrough and having tongues on opposite ends adapted to be bent about the ends of the segments for retaining the frames and tread members in position.

In testimony whereof I affix my signature.

HERBERT E. HUNSBERGER.